(12) United States Patent
Chen et al.

(10) Patent No.: US 9,024,944 B2
(45) Date of Patent: May 5, 2015

(54) DISPLAY PANEL

(71) Applicant: AU Optronics Corporation, Hsin-Chu (TW)

(72) Inventors: Yan-Ciao Chen, Hsin-Chu (TW); Yu-Sheng Huang, Hsin-Chu (TW); Chia-Lun Chiang, Hsin-Chu (TW); Meng-Ju Tsai, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 148 days.

(21) Appl. No.: 13/691,939

(22) Filed: Dec. 3, 2012

(65) Prior Publication Data

US 2013/0155056 A1    Jun. 20, 2013

(30) Foreign Application Priority Data

Dec. 15, 2011   (TW) ................. 100146509 A (51) Int. Cl.
*G09G 5/02*       (2006.01)
*G09G 3/20*       (2006.01)
*H04N 13/00*      (2006.01)
*H04N 13/04*      (2006.01)

(52) U.S. Cl.
CPC .................. *G09G 5/026* (2013.01); *G09G 3/20* (2013.01); *H04N 13/00* (2013.01); *H04N 13/0413* (2013.01); *H04N 13/0452* (2013.01)

(58) Field of Classification Search
CPC .................................................. H04N 13/0018
USPC .................................................. 345/419, 613
See application file for complete search history.

(56) References Cited

U.S. PATENT DOCUMENTS

| | | | |
|---|---|---|---|
| 7,215,475 B2 | 5/2007 | Woodgate et al. | |
| 8,633,974 B2 | 1/2014 | Kang et al. | |
| 2006/0164528 A1 | 7/2006 | Harrold et al. | |
| 2007/0057901 A1* | 3/2007 | Chino | 345/102 |
| 2007/0063946 A1* | 3/2007 | Nakamura et al. | 345/88 |
| 2008/0129676 A1* | 6/2008 | Kim et al. | 345/99 |
| 2009/0046142 A1* | 2/2009 | Cha et al. | 348/54 |
| 2010/0289884 A1* | 11/2010 | Kang | 348/58 |
| 2012/0038829 A1* | 2/2012 | Mitani et al. | 348/649 |

FOREIGN PATENT DOCUMENTS

| | | |
|---|---|---|
| CN | 1912704 A | 2/2007 |
| CN | 101191931 A | 6/2008 |
| CN | 101888564 A | 11/2010 |

* cited by examiner

*Primary Examiner* — Maurice L McDowell, Jr.
*Assistant Examiner* — Kyle Zhai
(74) *Attorney, Agent, or Firm* — WPAT, PC; Justin King (57) ABSTRACT

Pixel structural designs on a display panel are disclosed. Each pixel on the display panel includes a plurality of sub-pixels. The sub-pixels are arranged sequentially along a vertical direction and used for displaying different colors in a circle. The display panel in the disclosure can be switched between a two-dimensional mode and a three-dimensional mode. In the three-dimensional mode, parts of the sub-pixels are disabled for forming a shielding area. Other adjacent sub-pixels form a pixel displaying unit.

9 Claims, 5 Drawing Sheets

DISPLAY PANEL

RELATED APPLICATIONS

This application claims priority to Taiwan Patent Application Serial Number 100146509, filed Dec. 15, 2011, which is herein incorporated by reference.

BACKGROUND

1. Technical Field

The present disclosure relates to a display panel. More particularly, the present disclosure relates to a display panel switchable between 2D/3D modes and a pixel structural design thereof.

2. Description of Related Art

In recent years, breakthroughs have been achieved in the stereoscopic display technology. Products applicable to stereoscopic televisions and movies begin widely spreading in the market. The stereoscopic visual effect results from separately projecting left-vision and right-vision images of different visual angles to a viewer's eyes. Through the left-vision and right-vision images, the effect of depth of field due to the distance between two eyes is simulated. Besides, it has been developed in the art that display devices are capable of switching between two-dimensional (2D) and three-dimensional (3D) displaying modes.

Under the three-dimensional displaying mode, the left-vision and right-vision images have to be projected to the viewer's two eyes independently; in other words, the viewer's right eye cannot see the left-vision image, and vice versa. The viewer normally wears a pair of optical filter glasses, e.g., optical filter glasses with pattern retarder, to achieve the separation of right/left vision images. Such pattern retarder technology applied in the 3D display device has advantages like providing low costs and lighter weights of the optical filter glasses.

The crosstalk between right and left visions (e.g., the left eye seeing the left vision image and part of the right vision image at the same time) is one common issue on current 3D display device. The crosstalk issue may cause visual blurs or interferences between right/left visions, and further reduce the quality of image displaying. Some traditional methods are provided to solve the crosstalk issue in the art. For example, on an Advanced Multi-domain Vertical Alignment (AMVA) display panel, each sub-pixel can be divided into a primary area and secondary area. Under the three-dimensional displaying mode, the primary area of each sub-pixel is turn off to increase the width of shielding area between two sub-pixels, such that the distance between two vision images is broadened for reducing the crosstalk effect. However, shutting down the primary area of sub-pixels will disable the Low Color Washout function on the Multi-domain Vertical Alignment (MVA) display panel, and also cause severe color shifting problems on the MVA display panel when users observes from biased view points.

Figure 1A:
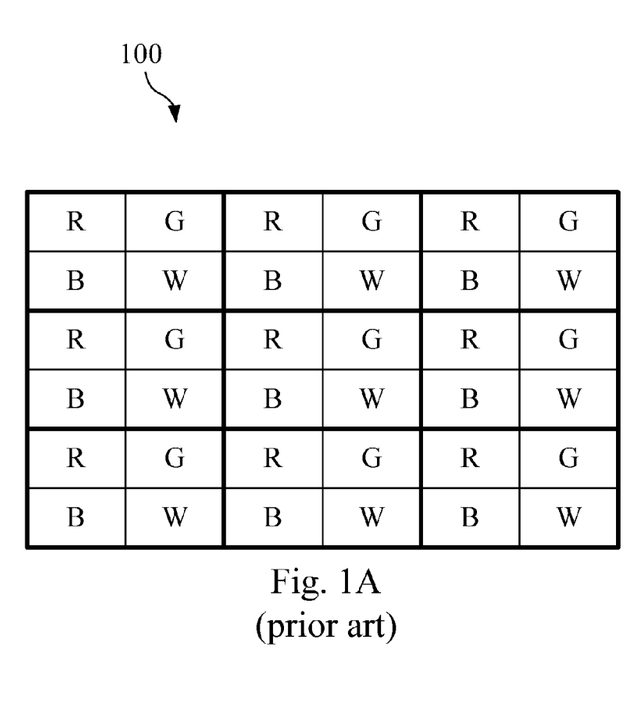
FIG. 1A and FIG. 1B are schematic diagrams illustrating a display panel capable switching between 2D/3D displaying modes.
Figure 1B:
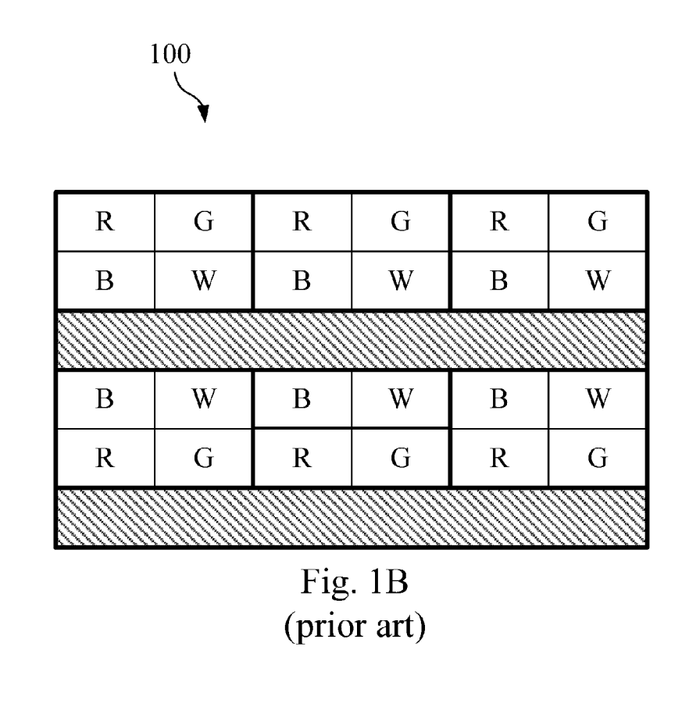

FIG. 1A and FIG. 1B are schematic diagrams illustrating a display panel 100 capable switching between 2D/3D displaying modes. FIG. 1A illustrates the display panel 100 under 2D displaying mode, and FIG. 1B illustrates the display panel 100 under 3D displaying mode. As shown in FIG. 1A under a 2D displaying mode, one pixel displaying unit is formed by four array-shaped sub-pixels with four colors. As shown in FIG. 1B under a 3D displaying mode, one row of every three rows on the display panel 100 along a vertical direction is turn off to increase the shielding area. However, this solution will substantial reduce the vertical resolution of the display panel 100. In this case, the vertical resolution of the display panel 100 will be reduced by 33%.

SUMMARY

To solve the problems in the art, the disclosure provides some designs of pixel structure on a display panel. The pixel structural is configured to turn off part of the sub-pixels between pixels for increasing the shielding area, so as to ease the crosstalk issue in 3D displaying mode. In addition, the practice manner disclosed in the disclosure does not affect the Low Color Washout function on the Multi-domain Vertical Alignment (MVA) display panel, and not over-sacrifice the resolution of the display panel.

An aspect of the disclosure is to provide a display panel, which includes a plurality of pixels. Each pixel includes a plurality of sub-pixels. The sub-pixels comprising at least a first sub-pixel, at least a second sub-pixel, at least a third sub-pixel and at least a fourth sub-pixel arranged sequentially and repeatedly along a vertical direction. Under a two-dimensional displaying mode, the first sub-pixel, the second sub-pixel, the third sub-pixel and the fourth sub-pixel adjacent along the vertical direction are correspondingly configured to display a first color, a second color, a third color and a fourth color, and so as to form a pixel displaying unit. Under a three-dimensional displaying mode, the fourth sub-pixel forms a shielding area. The first sub-pixel, the second sub-pixel and the third sub-pixel adjacent along the vertical direction are configured to form a pixel displaying unit.

According to an embodiment of the invention, the first color, the second color, the third color and the fourth color are respectively red, blue, green and white.

According to another embodiment of the invention, the first color, the second color and the third color are three different primary colors, and the fourth color is a color mixed by at least two colors among the three primary colors.

Another aspect of the invention is to provide a display panel, which includes a plurality of pixels. Each pixel includes a plurality of sub-pixels. The sub-pixels comprising at least a first sub-pixel, at least a second sub-pixel, at least a third sub-pixel and at least a fourth sub-pixel arranged sequentially and repeatedly along a vertical direction. Under a two-dimensional displaying mode, the first sub-pixel, the second sub-pixel, the third sub-pixel and the fourth sub-pixel adjacent along the vertical direction are correspondingly configured to display a first color, a second color, a third color and a fourth color, and so as to form a pixel displaying unit. Under a three-dimensional displaying mode, the sub-pixels on (M−4) rows among every M rows along the vertical direction form a shielding area. Four adjacent sub-pixels other than the shielding area along the vertical direction are configured to form a pixel displaying unit. M is an integer equal to or larger than 5.

According to an embodiment of the disclosure, when M is equal to 5, the first sub-pixel, the second sub-pixel, the third sub-pixel and the fourth sub-pixel adjacent along the vertical direction, or the second sub-pixel, the third sub-pixel, the fourth sub-pixel and the first sub-pixel adjacent along the vertical direction, or the third sub-pixel, the fourth sub-pixel, the first sub-pixel and the second sub-pixel adjacent along the vertical direction, or the fourth sub-pixel, the first sub-pixel, the second sub-pixel and the third sub-pixel adjacent along the vertical direction are configured to form a pixel displaying unit.

According to another embodiment of the disclosure, when M is equal to 6, the first sub-pixel, the second sub-pixel, the third sub-pixel and the fourth sub-pixel adjacent along the vertical direction, or the third sub-pixel, the fourth sub-pixel, the first sub-pixel and the second sub-pixel adjacent along the vertical direction are configured to form a pixel displaying unit.

According to an embodiment of the disclosure, the first color, the second color, the third color and the fourth color are respectively red, blue, green and white.

According to another embodiment of the disclosure, the first color, the second color and the third color are three different primary colors, and the fourth color is a color mixed by at least two colors among the three primary colors.

Another aspect of the disclosure is to provide a display panel, which includes a plurality of pixels. Each pixel includes a plurality of sub-pixels. The sub-pixels include at least a first sub-pixel, at least a second sub-pixel and at least a third sub-pixel arranged sequentially and repeatedly along a vertical direction. Under a two-dimensional displaying mode, the first sub-pixel, the second sub-pixel and the third sub-pixel adjacent along the vertical direction are correspondingly configured to display a first color, a second color and a third color, so as to form a pixel displaying unit. Under a three-dimensional displaying mode, the sub-pixels on (N−3) rows among every N rows along the vertical direction form a shielding area. Three adjacent sub-pixels other than the shielding area along the vertical direction are configured to form a pixel displaying unit. N is an integer equal to or larger than 4.

According to an embodiment of the disclosure, when N is equal to 4, the first sub-pixel, the second sub-pixel and the third sub-pixel adjacent along the vertical direction, or the second sub-pixel, the third sub-pixel and the first sub-pixel adjacent along the vertical direction, or the third sub-pixel, the first sub-pixel and the second sub-pixel adjacent along the vertical direction are configured to form a pixel displaying unit.

According to an embodiment of the disclosure, the first color, the second color and the third color are respectively red, blue and green.

According to another embodiment of the disclosure, the first color, the second color and the third color are three different primary colors.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following description, several specific details are presented to provide a thorough understanding of the embodiments of the present disclosure. One skilled in the relevant art will recognize, however, that the present disclosure can be practiced without one or more of the specific details, or in combination with or with other components, etc. In other instances, well-known implementations or operations are not shown or described in detail to avoid obscuring aspects of various embodiments of the present disclosure.

Figure 2A:
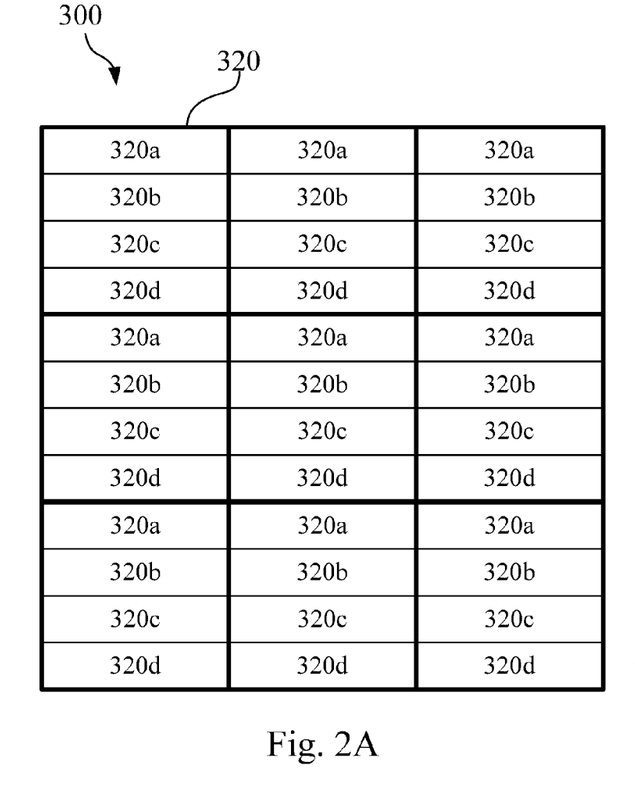
FIG. 2A and FIG. 2B are schematic diagrams illustrating a display panel according to a first embodiment of the disclosure.
Figure 2B:
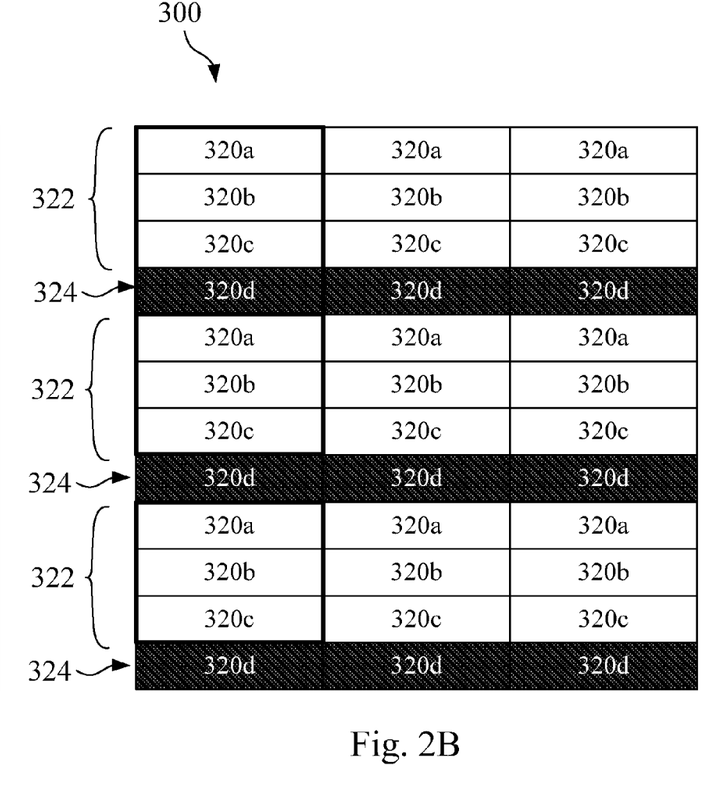

Please refer to FIG. 2A and FIG. 2B, which are schematic diagrams illustrating a display panel 300 according to a first embodiment of the disclosure. FIG. 2A illustrates the display panel 300 under a two-dimensional (2D) displaying mode, and FIG. 2B illustrates the display panel 300 under a three-dimensional (3D) displaying mode.

As shown in FIG. 2A, the display panel 300 of the first embodiment of the disclosure includes several pixels 320. Each pixel 320 includes a plurality of sub-pixels. In the embodiment, each pixel includes four sub-pixels, which are a first sub-pixel 320a, a second sub-pixel 320b, a third sub-pixel 320c and a fourth sub-pixel 320d. As in the example shown in FIG. 2A, four sub-pixels 320a, 320b, 320c and 320d are arranged parallel to each other, and each sub-pixel is formed in a horizontal bar shape.

It is to be noticed that, the sub-pixels 320a, 320b, 320c and 320d are configured to be bar shapes extending along a horizontal direction. In addition, the display panel 300 can be a portrait-type display panel in practical applications. For example, the aspect ratio of the display panel 300 can be 9:16, 10:16 or 3:4, and a source driver of the display panel 300 can be disposed on the right/left sides, which are short edges of the display panel 300, but the disclosure is not limited thereto.

In this embodiment, the first sub-pixel 320a, the second sub-pixel 320b, the third sub-pixel 320c and the fourth sub-pixel 320d are configured to display red, green, blue and white colors, respectively. The first sub-pixel 320a, the second sub-pixel 320b, the third sub-pixel 320c and the fourth sub-pixel 320d are arranged sequentially and repeatedly along a vertical direction (or along the column-direction on the display panel 300). Therefore, each row can be formed by sub-pixels in the same order. For example, there are several first sub-pixels 320a arranged on the first row, and several second sub-pixels 320b arranged on the second row, etc. Under the two-dimensional displaying mode, every four adjacent sub-pixels along the vertical direction are configured to form one pixel displaying unit, such that a pixel array with arranged pixels 320 can be constructed.

As shown in FIG. 2B under the 3D displaying mode, the fourth sub-pixel 320d (displaying the white color in the 2D display mode) is configured to form a shielding area 324. For example, the shielding effect on the fourth sub-pixel 320d can be achieved by reducing the optical transmission rate, turning off the backlight corresponding to the sub-pixel, turning down the brightness configuration or approaching the brightness configuration to dark state. Under the 3D displaying mode, the first sub-pixel 320a, the second sub-pixel 320b and the third sub-pixel 320c adjacent along the vertical direction are configured to form one single pixel displaying unit (such as the pixel displaying unit 322 shown in FIG. 2B).

It is to be noticed that, under the 3D displaying mode of this embodiment, the first sub-pixel 320a for displaying the red color, the second sub-pixel 320b for displaying the green color and the third sub-pixel 320c for displaying the blue color remain their normal functions in displaying and form one pixel displaying unit. Therefore, the vertical resolution of the display panel 300 is substantially the same under the 2D displaying mode and 3D displaying mode. In other words, the vertical resolution of the display panel 300 is not reduced under the 3D displaying mode in this embodiment.

Under the 3D displaying mode, the fourth sub-pixel 320d originally for displaying white color is utilized to form the shielding area 324, such that the separation distance between two pixels is broadened, so as to reduce the crosstalk issue under the 3D displaying mode.

Furthermore, the pixel structural design of the display panel 300 in this embodiment can be used in a Multi-domain Vertical Alignment (MVA) display panel. As an embodiment, within a MVA display panel, each of the sub-pixels (the first sub-pixel 320a, the second sub-pixel 320b, the third sub-pixel 320c and the fourth sub-pixel 320d) further include a primary area and a secondary area. Each of the primary area and the secondary area includes multi-domains for enlarging the viewing angle on the display panel 300. Instead of turning off all of the primary areas within each of the sub-pixels, this embodiment under 3D displaying mode utilizes the fourth sub-pixel 320d originally for displaying white color to form the shielding area 324. In the meantime, the primary areas and the secondary areas within other sub-pixels (320a, 320b and 320c) remain their normal functions in displaying, such that the Low Color Washout function on the display panel can be executed normally. Therefore, the pixel structural design of the display panel 300 in this embodiment can be widely applied in a Multi-domain Vertical Alignment (MVA) display panel.

In aforesaid embodiment, the first sub-pixel 320a, the second sub-pixel 320b, the third sub-pixel 320c and the fourth sub-pixel 320d can be configured to display red, green, blue and white colors, respectively. However, the disclosure is not limited thereto. In another embodiment, the first sub-pixel 320a, the second sub-pixel 320b and the third sub-pixel 320c can be configured to display three different primary colors in optics, and the fourth sub-pixel 320d can be configured to display a color mixed by at least two colors from the three primary colors. This color assignment in this embodiment can be used on the pixel structural design disclosed in the first embodiment to achieve similar effects.

Figure 3A:
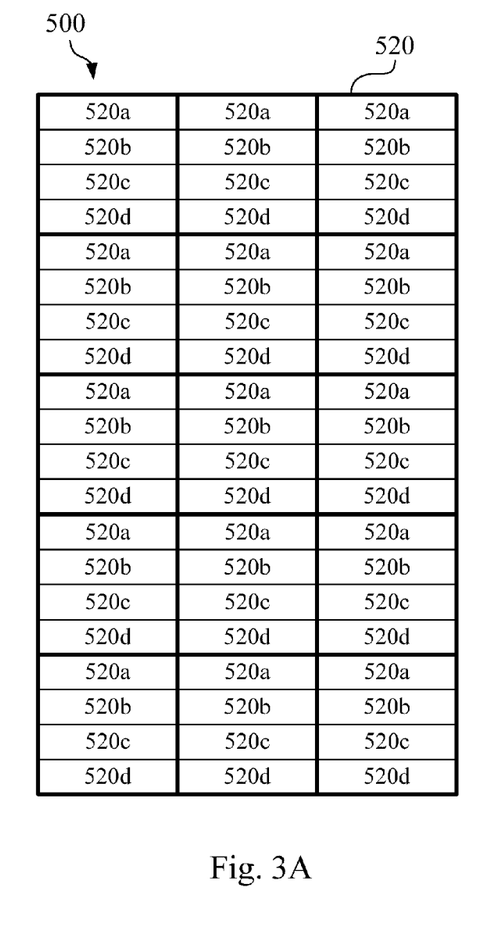
FIG. 3A and FIG. 3B are schematic diagrams illustrating a display panel according to a second embodiment of the disclosure.
Figure 3B:
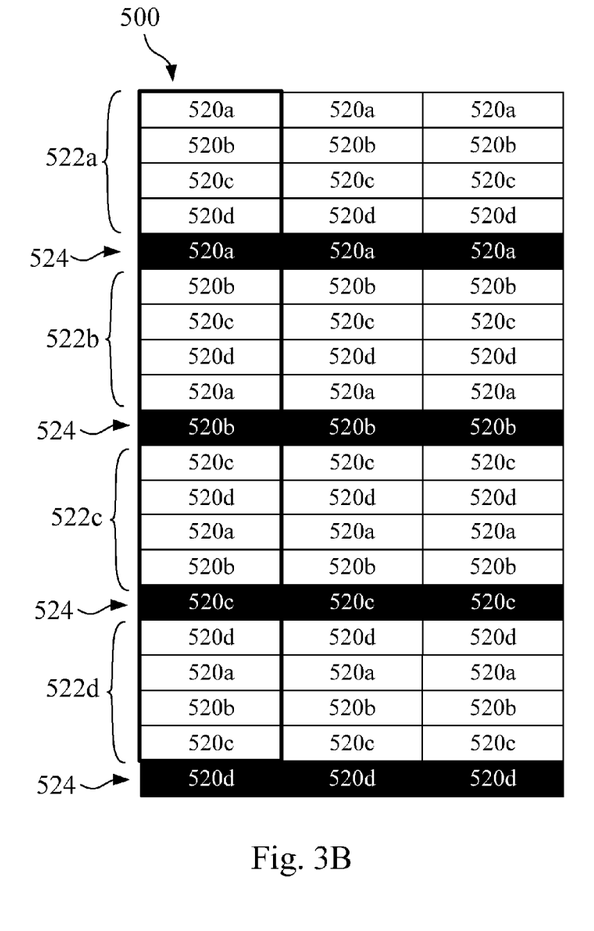

Referring to FIG. 3A and FIG. 3B, they are schematic diagrams illustrating a display panel 500 according to a second embodiment of the disclosure. FIG. 3A illustrates the display panel 500 under a two-dimensional (2D) displaying mode, and FIG. 3B illustrates the display panel 500 under a three-dimensional (3D) displaying mode.

As shown in FIG. 3A, the display panel 500 in the first embodiment of the disclosure includes several pixels 520. Each pixel 520 includes a plurality of sub-pixels. In the embodiment, each pixel includes four sub-pixels, which are a first sub-pixel 520a, a second sub-pixel 520b, a third sub-pixel 520c and a fourth sub-pixel 520d. As in the example shown in FIG. 3A, four sub-pixels 520a, 520b, 520c and 520d are parallel to each other, and each sub-pixel is formed in a horizontal bar shape.

It is to be noticed that, the sub-pixels 520a, 520b, 520c and 520d are configured to be bar shapes extending along a horizontal direction. In addition, the display panel 500 can be a portrait-type display panel in practical applications. A source driver of the display panel 500 can be implemented on the right/left sides, which are short edges of the display panel 500.

In this embodiment, the first sub-pixel 520a, the second sub-pixel 520b, the third sub-pixel 520c and the fourth sub-pixel 520d can be configured to display red, green, blue and white colors, respectively. The first sub-pixel 520a, the second sub-pixel 520b, the third sub-pixel 520c and the fourth sub-pixel 520d are arranged sequentially and repeatedly along a vertical direction (or along the column-direction on the display panel 500). Therefore, each row can be formed by sub-pixels in the same order. For example, there are several first sub-pixels 520a arranged on the first row, and several second sub-pixels 520b arranged on the second row, etc. Under the two-dimensional displaying mode, every four adjacent sub-pixels along the vertical direction are configured to form one pixel displaying unit, such that a pixel array with arranged pixels 520 can be constructed.

As shown in FIG. 3B under the 3D displaying mode, the sub-pixels on the last one row among every five rows along the vertical direction is configured to form a shielding area 524. For example, the shielding area 524 can be achieved by reducing the optical transmission rate, turning off the backlight corresponding to the sub-pixel, turning down the brightness configuration or approaching the brightness configuration to dark state. Under the 3D displaying mode in the second embodiment, the sub-pixels on one of every five rows are assigned to form the shielding area 524. In this case, the original displaying colors (under the 2D displaying mode) of the sub-pixels forming the shielding area 524 will change in sequence (depending on which row the sub-pixels belongs to).

Four adjacent sub-pixels other than the shielding area 524 along the vertical direction are configured to form one pixel displaying unit, such as the pixel displaying unit 522a, the pixel displaying unit 522b and the pixel displaying unit 522c, etc. In this embodiment, the composition order of internal sub-pixels within the pixel displaying unit will change circularly. As shown in FIG. 3B, the pixel displaying unit 522a is composed of the first sub-pixel 520a, the second sub-pixel 520b, the third sub-pixel 520c and the fourth sub-pixel 520d adjacent along a vertical direction; or, the pixel displaying unit 522b is composed of the second sub-pixel 520b, the third sub-pixel 520c, the fourth sub-pixel 520d and the first sub-pixel 520a adjacent along a vertical direction; or, the pixel displaying unit 522c is composed of the third sub-pixel 520c, the fourth sub-pixel 520d, the first sub-pixel 520a and the second sub-pixel 520b adjacent along a vertical direction; or, the pixel displaying unit 522d is composed of the fourth sub-pixel 520d, the first sub-pixel 520a, the second sub-pixel 520b and the third sub-pixel 520c adjacent along a vertical direction.

It is to be noticed that, under the 3D displaying mode of this embodiment, the sub-pixels on the last one row among every five rows along the vertical direction is configured to form a shielding area 524. Therefore, the vertical resolution of the display panel 500 is decreased by ⅕ of the original vertical resolution. The influence is relative minor.

The shielding area 524 is formed to enlarge the separation distance between two pixels and reduce the crosstalk issue under the 3D displaying mode. In addition, the pixel structural design of the display panel 500 disclosed in this embodiment can be widely applied in a Multi-domain Vertical Alignment (MVA) display panel, and the Low Color Washout function can be executed normally on the display panel in this embodiment.

In the example disclosed in aforesaid embodiment, the first sub-pixel 520a, the second sub-pixel 520b, the third sub-pixel 520c and the fourth sub-pixel 520d can be configured to display red, green, blue and white colors respectively. However, the disclosure is not limited thereto. In another embodiment, the first sub-pixel 520a, the second sub-pixel 520b and the third sub-pixel 520c are configured to display three different primary colors in optics, and the fourth sub-pixel 520d is configured to display a color mixed by at least two colors from the three primary colors. The color assignment in this embodiment can be used in the pixel structural design of the first embodiment to achieve similar effects.

Furthermore, in aforesaid embodiment, two pixels on two adjacent columns have the same order in displaying color sequence. The sub-pixels in the pixel display unit 522a are arranged in red, green, blue and white colors, and all the pixel display units on the right side of the pixel display unit 522a adopt the same order in displaying color sequence, but the disclosure is not limited thereto. In another embodiment, the sub-pixels within the pixels on different columns have mismatched orders, i.e., the Sub-pixel Rendering technique. For example, the sub-pixels of the pixel on the second column can be arranged in blue, white, red and green, or arranged in any equivalent color order. The Sub-pixel Rendering technique is well known by a person in the art, and not to be discussed further here.

Furthermore, in the display panel 500 according to the second embodiment, the sub-pixels on the last one row among every five rows along the vertical direction is configured to form the shielding area 524, but the disclosure is not limited to form the shielding area 524 on one row of every five rows.

Figure 4A:
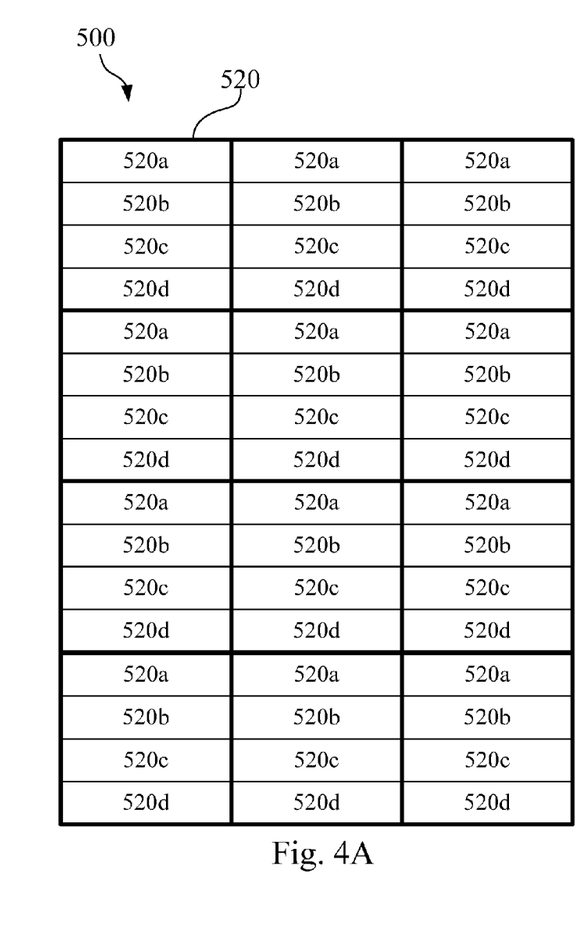
FIG. 4A and FIG. 4B are schematic diagrams illustrating a display panel according to a third embodiment of the disclosure.
Figure 4B:
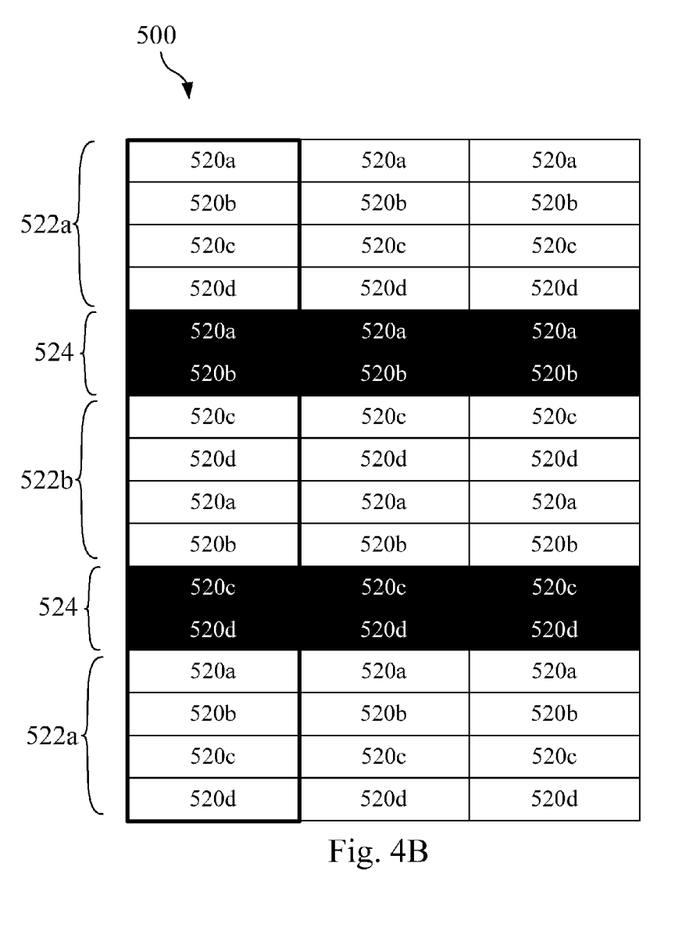

Reference is made to FIG. 4A and FIG. 4B, which are schematic diagrams illustrating a display panel 500 according to a third embodiment of the disclosure. FIG. 4A illustrates the display panel 500 under a two-dimensional (2D) displaying mode, and FIG. 4B illustrates the display panel 500 under a three-dimensional (3D) displaying mode.

As shown in FIG. 4B in the third embodiment, on the display panel 500 under the 3D displaying mode, the sub-pixels on the last two rows among every six rows along the vertical direction is configured to form a shielding area 524. Four adjacent sub-pixels other than the shielding area 524 along the vertical direction are configured to form one pixel displaying unit, such as the pixel displaying unit 522a and the pixel displaying unit 522b. The composition order of internal sub-pixels within the pixel displaying unit will change circularly. Other structures of the display panel 500 according to the third embodiment are similar to the display panel 500 according to the second embodiment, and can be referred to the detail descriptions in the second embodiment.

Based on the second and the third embodiments, the disclosure discloses that the sub-pixels on the last (M−4) rows among every M rows along the vertical direction form a shielding area on the display panel under three-dimensional displaying mode. Four adjacent sub-pixels other than the shielding area along the vertical direction are configured to form one pixel displaying unit. M is an integer equal to or larger than five. For example, the second embodiment demonstrates the case of M is equal to five, and the second embodiment demonstrates the case of M is equal to six. In other embodiments, M can be seven or above.

Figure 5A:
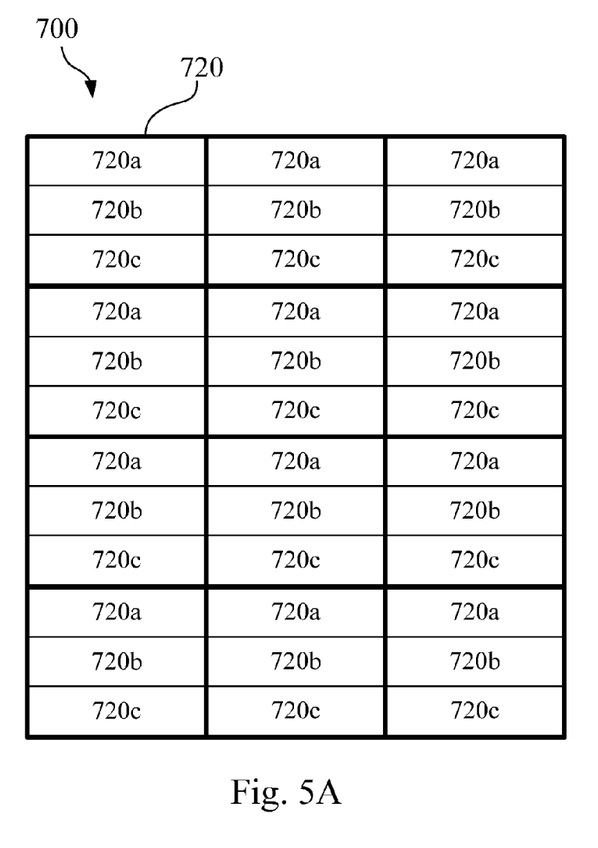
FIG. 5A and FIG. 5B are schematic diagrams illustrating a display panel according to a fourth embodiment of the disclosure.
Figure 5B:
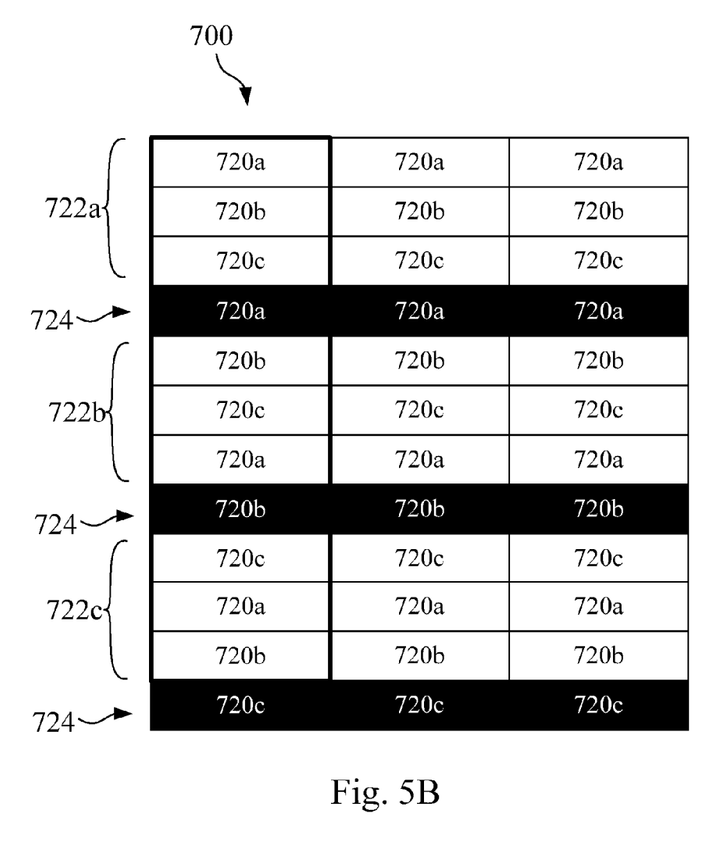

Reference is made to FIG. 5A and FIG. 5B, which are schematic diagrams illustrating a display panel 700 according to a fourth embodiment of the disclosure. FIG. 5A illustrates the display panel 700 under a two-dimensional (2D) displaying mode, and FIG. 5B illustrates the display panel 700 under a three-dimensional (3D) displaying mode.

As shown in FIG. 5A, the display panel 700 in the fourth embodiment of the disclosure includes several pixels 720. Each pixel 720 includes a plurality of sub-pixels. In the embodiment, each pixel includes three sub-pixels, which are a first sub-pixel 720a, a second sub-pixel 720b and a third sub-pixel 720c.

It is to be noticed that, the sub-pixels 720a, 720b and 720c are configured to be bar shapes extending along a horizontal direction. In addition, the display panel 700 can be a portrait-type display panel in practical applications. A source driver of the display panel 700 can be implemented on the right/left sides, which are short edges of the display panel 700.

In this embodiment, the first sub-pixel 720a, the second sub-pixel 720b and the third sub-pixel 720c can be configured to display red, green and blue colors respectively. Or in another embodiment, the first sub-pixel 720a, the second sub-pixel 720b and the third sub-pixel 720c can be configured to display three different primary colors in optics. The first sub-pixel 720a, the second sub-pixel 720b, and the third sub-pixel 720c are arranged sequentially and repeatedly along a vertical direction (or along the column-direction on the display panel 700). Therefore, each row can be formed by sub-pixels in the same order. For example, there are several first sub-pixels 720a arranged on the first row, and several second sub-pixels 720b arranged on the second row, etc. Under the two-dimensional displaying mode, every three adjacent sub-pixels along the vertical direction are configured to form one pixel displaying unit, such that a pixel array with arranged pixels 720 can be constructed.

As shown in FIG. 5B under the 3D displaying mode, the sub-pixels on the last (N−3) rows among every N rows along the vertical direction form a shielding area. N is an integer above and including four. In the fourth embodiment, the sub-pixels on the last one row among every four rows along the vertical direction form the shielding area 724. For example, the shielding area 724 can be achieved by reducing the optical transmission rate, turning off the backlight corresponding to the sub-pixel, turning down the brightness configuration or approaching the brightness configuration to dark state. In this case, the original displaying colors (under the 2D displaying mode) of the sub-pixels forming the shielding area 724 will change in sequence (depending on which row the sub-pixels belongs to).

Under the 3D displaying mode, three adjacent sub-pixels other than the shielding area 724 along the vertical direction are configured to form one pixel displaying unit, such as the pixel displaying unit 722a, the pixel displaying unit 722b and the pixel displaying unit 722c, etc. In this embodiment, the composition order of internal sub-pixels within the pixel displaying unit will change circularly. As shown in FIG. 5B, the pixel displaying unit 722a is composed of the first sub-pixel 720a, the second sub-pixel 720b and the third sub-pixel 720c adjacent along a vertical direction; or, the pixel displaying unit 722b is composed of the second sub-pixel 720b, the third sub-pixel 720c and the first sub-pixel 720a adjacent along a vertical direction; or, the pixel displaying unit 722c is composed of the third sub-pixel 720c, the first sub-pixel 720a and the second sub-pixel 720b adjacent along a vertical direction.

It is to be noticed that, the shielding area 724 in this embodiment is formed to enlarge the separation distance between two pixels and reduce the crosstalk issue under 3D displaying mode.

As mentioned in above paragraphs, the disclosure provides some designs of pixel structure on a display panel. The pixel structural is configured to turn off part of the sub-pixels between pixels for increasing the shielding area, so as to ease the crosstalk issue under 3D displaying mode. In addition, the practice manner disclosed in the disclosure does not affect the Low Color Washout function on the Multi-domain Vertical Alignment (MVA) display panel, and not over-sacrifice the resolution of the display panel.

As is understood by a person skilled in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A display panel, comprising:
a plurality of pixels, each pixel comprising at least a first sub-pixel, at least a second sub-pixel, at least a third sub-pixel and at least a fourth sub-pixel arranged sequentially and repeatedly along a vertical direction,
wherein, under a two-dimensional displaying mode, the first sub-pixel, the second sub-pixel, the third sub-pixel and the fourth sub-pixel adjacent along the vertical direction are correspondingly configured to display a first color, a second color, a third color and a fourth color, so as to form a pixel displaying unit; and
wherein, under a three-dimensional displaying mode, the sub-pixels on (M−4) rows among every M rows along the vertical direction form a shielding area for broadening a separation distance between two pixels, four adjacent sub-pixels other than the shielding area along the vertical direction are configured to form one pixel displaying unit, M is an integer equal to or larger than 5.

2. The display panel as claimed in claim 1, wherein, when M is equal to 5, the first sub-pixel, the second sub-pixel, the third sub-pixel and the fourth sub-pixel adjacent along the vertical direction, or the second sub-pixel, the third sub-pixel, the fourth sub-pixel and the first sub-pixel adjacent along the vertical direction, or the third sub-pixel, the fourth sub-pixel, the first sub-pixel and the second sub-pixel adjacent along the vertical direction, or the fourth sub-pixel, the first sub-pixel, the second sub-pixel and the third sub-pixel adjacent along the vertical direction are configured to form a pixel displaying unit.

3. The display panel as claimed in claim 1, wherein, when M is equal to 6, the first sub-pixel, the second sub-pixel, the third sub-pixel and the fourth sub-pixel adjacent along the vertical direction, or the third sub-pixel, the fourth sub-pixel, the first sub-pixel and the second sub-pixel adjacent along the vertical direction are configured to form a pixel displaying unit.

4. The display panel as claimed in claim 1, wherein the first color, the second color, the third color and the fourth color are respectively red, green, blue and white.

5. The display panel as claimed in claim 1, wherein the first color, the second color and the third color are three different primary colors, and the fourth color is a color mixed by at least two colors among the three primary colors.

6. A display panel, comprising:
a plurality of pixels, each pixel comprising a plurality of sub-pixels, the sub-pixels comprising at least a first sub-pixel, at least a second sub-pixel and at least a third sub-pixel arranged sequentially and repeatedly along a vertical direction;
wherein, under two-dimensional displaying mode, the first sub-pixel, the second sub-pixel and the third sub-pixel adjacent along the vertical direction are correspondingly configured to display a first color, a second color and a third color, so as to form one pixel displaying unit;
wherein, under a three-dimensional displaying mode, the sub-pixels on (N−3) rows among every N rows along the vertical direction form a shielding area for broadening a separation distance between two pixels, three adjacent sub-pixels other than the shielding area along the vertical direction are configured to form one pixel displaying unit, N is an integer equal to or larger than 4.

7. The display panel as claimed in claim 6, wherein, when N is equal to 4, the first sub-pixel, the second sub-pixel and the third sub-pixel adjacent along the vertical direction, or the second sub-pixel, the third sub-pixel and the first sub-pixel adjacent along the vertical direction, or the third sub-pixel, the first sub-pixel and the second sub-pixel adjacent along the vertical direction are configured to form a pixel displaying unit.

8. The display panel as claimed in claim 6, wherein the first color, the second color and the third color are respectively red, green and blue.

9. The display panel as claimed in claim 6, wherein the first color, the second color and the third color are three different primary colors.

* * * * *